(12) United States Patent
Agirre Urzelai

(10) Patent No.: US 12,508,776 B2
(45) Date of Patent: Dec. 30, 2025

(54) CLAMPING RING AND METHOD OF FORMING THE SAME

(71) Applicant: AURAY MANAGING, S.L., Barcelona (ES)

(72) Inventor: Iker Agirre Urzelai, Palau Plegamans (ES)

(73) Assignee: AURAY MANAGING, S.L., Barcelona (ES)

( * ) Notice: Subject to any disclaimer, the term of this patent is extended or adjusted under 35 U.S.C. 154(b) by 328 days.

(21) Appl. No.: 17/554,267

(22) Filed: Dec. 17, 2021

(65) Prior Publication Data

US 2023/0191711 A1 Jun. 22, 2023

(30) Foreign Application Priority Data

Dec. 16, 2021 (EP) ..................................... 21383146

(51) Int. Cl.
| | |
|---|---|
| *B29C 65/08* | (2006.01) |
| *B29C 48/00* | (2019.01) |
| *B29C 65/48* | (2006.01) |
| *F16L 13/00* | (2006.01) |
| *F16L 47/22* | (2006.01) |

(Continued)

(52) U.S. Cl.
CPC .......... *B29C 65/08* (2013.01); *B29C 48/0022* (2019.02); *B29C 65/48* (2013.01); *F16L 13/004* (2013.01); *F16L 47/22* (2013.01); *B29K 2023/0691* (2013.01); *B29L 2031/24* (2013.01);

(Continued)

(58) Field of Classification Search
CPC ..... B29C 65/08; B29C 65/48; B29C 48/0022; F16L 13/004; F16L 47/02; F16L 47/06; F16L 47/22; B29L 2031/24; B29L 2031/7096; B29K 2023/0691
See application file for complete search history.

(56) References Cited

U.S. PATENT DOCUMENTS

| | | | | |
|---|---|---|---|---|
| 3,312,483 A | * | 4/1967 | Leadbetter ............ | F16L 19/086 285/423 |
| 3,874,709 A | * | 4/1975 | MacDonald .......... | F16L 37/091 285/104 |

(Continued)

FOREIGN PATENT DOCUMENTS

| | | |
|---|---|---|
| EP | 1741968 A1 | 1/2007 |
| EP | 2170583 B1 | 9/2013 |
| EP | 2222999 B1 | 3/2019 |

*Primary Examiner* — David Bochna
(74) *Attorney, Agent, or Firm* — Maier & Maier, PLLC

(57) ABSTRACT

A method of manufacturing a clamping ring for a cold-expansion joining system includes providing an extruded pipe part made of a cross-linked polymeric material where, while extruding the pipe part, the inner diameter is formed bigger than the outer diameter of a flexible cross-linked polymeric pipe onto which the clamping ring is positioned before making a pipe connection; providing an injection molded annular part having an inner diameter formed smaller than the inner diameter of the extruded part; and bonding the parts together to form a clamping ring having an inward protruding stop edge at one of its ends. The embodiments further relate to a clamping ring formed from an extruded pipe part made of a cross-linked polymeric material and an injection molded annular part bonded together to form a unitary structure including an inward protruding stop edge at one of its ends.

19 Claims, 4 Drawing Sheets

(51) Int. Cl.
  *B29K 23/00* (2006.01)
  *B29L 31/00* (2006.01)
  *B29L 31/24* (2006.01)
  *F16L 47/20* (2006.01)

(52) U.S. Cl.
  CPC ....... *B29L 2031/7096* (2013.01); *F16L 13/00* (2013.01); *F16L 47/20* (2013.01)

(56) References Cited

U.S. PATENT DOCUMENTS

| | | | | |
|---|---|---|---|---|
| 4,047,739 | A * | 9/1977 | Aitken | F16L 47/10 285/379 |
| 6,464,266 | B1 * | 10/2002 | O'Neill | F16L 37/088 285/40 |
| 6,832,785 | B1 * | 12/2004 | Zitkovic, Jr. | F16L 13/0209 285/285.1 |
| 10,093,063 | B2 | 10/2018 | Olinger et al. | |
| 10,864,670 | B2 | 12/2020 | You et al. | |
| 11,384,872 | B1 * | 7/2022 | Ericksen | B29C 66/543 |
| 2004/0201212 | A1 * | 10/2004 | Marks | F16L 47/00 285/124.1 |
| 2005/0062282 | A1 * | 3/2005 | Rosch | F16L 13/10 285/285.1 |
| 2009/0026756 | A1 * | 1/2009 | Bowman | B29C 66/7392 285/21.2 |
| 2012/0187133 | A1 * | 7/2012 | Landman | B29C 49/00 428/34.1 |
| 2018/0065282 | A1 | 3/2018 | Runyan | |
| 2019/0024833 | A1 * | 1/2019 | Lizarralde Iturbe | F16L 37/144 |
| 2019/0234528 | A1 * | 8/2019 | Mess | G01F 1/662 |

* cited by examiner

Fig. 7a                                              Fig. 7b

CLAMPING RING AND METHOD OF FORMING THE SAME

FIELD

The invention relates to a clamping ring and a method of forming a clamping ring to be used on a flexible cross-linked polymeric pipe when making a pipe connection.

BACKGROUND

It is known in the state of the art that a cold-expansion fitting connection between a flexible cross-linked polymeric pipe and a fitting may be further strengthen by placing a clamping ring around the end of the pipe or tubing prior to cold-expansion.

By forming both the clamping ring and the polymeric pipe from a cold-expansion material, i.e., having memory properties, and by placing the clamping ring at the axial end of the pipe, both the ring and pipe can be expanded simultaneously, moved over a fitting, and then allowed to return to substantially the same size and shape at room temperature. The addition of a clamping ring provides additional compressive forces beyond that of just the pipe to create a better seal for the connection and reinforces the interference fit between the pipe and the fitting over which the pipe is received.

It is also known in the state of the art that such clamping rings may comprise a stop edge at one of its ends to ensure that the clamping ring remains correctly positioned on the pipe end when a pipe connection is being made and after the pipe connection has been made.

EP2222999 B1 discloses a clamping ring and a method of forming the same comprising providing an extruded pipe part wherein its inner diameter is formed smaller than the outer diameter of the pipe onto which the clamping ring is positioned before making the pipe connection and making the diameter of the pipe larger by removing material from the inside of the pipe part but only over part of a length of the pipe part such that a stop edge is formed at one of its ends.

EP2170583 B1 discloses a method of forming a clamping ring from an extruded pipe part from a plastic material having memory properties comprising a stop edge at one of its ends wherein the extruded part is widened by means of heat and the end of the part is bent to form a stop edge.

U.S. Pat. No. 10,093,063 BB discloses a clamping ring comprising an inward extending stop edge disposed at an outlet end of the clamping ring, wherein the inner diameter of the pipe part is made larger by removing 3-25% of the material from the inside of the pipe part.

However, in order to create such a stop edge, the method of forming the clamping ring comprises a step of acting on the extruded part (either by machining or thermoforming) to modify its diameter. Plastic parts tend to bend or flex away from the cutting tool during machining, usually deflecting back after the cutter has passed, which makes it hard to manufacture reproducible and uniform pieces that fall within the specified dimensions and tolerances that clamping rings must comply with. On the other hand, thermoforming of the extruded part can cause uneven spots, causing weak points. Both solutions requiring more plastic material than that used to form the parts by means of other manufacturing processes (i.e., injection molding).

Clamping rings having a stop edge can also be manufactured by injection molding.

However, clamping rings when used in cold-expansion fittings connections are subjected to high loads under elastic deformation. Molded parts comprise weld lines, such weld lines being the weakest spot of an injection molded part that is made from a cross-linked polymeric material, leading to a risk for cracks in the weld line during the expansion procedure. Attempts to minimize this risk are known in the state of the art.

EP1741968 A1 discloses a clamping ring from a material that has memory properties made by injection molding and having an inward extending stop edge, wherein the strength of the clamping ring is increased by creating weld lines with a total length larger than the average wall thickness of the molded part.

US2018065282 AA discloses a method of manufacturing a clamping ring mold and compression collar lacking weld lines by means of carrying out the injection molding from a central injection port and removing material from an initially closed axial end of a tubular molded body to form an opening.

U.S. Pat. No. 10,864,670 BB discloses a method for manufacturing a clamping ring comprising a molding step of acting on a pipe member in a plastic melt state via a molding die set, to form a clamping ring having a limit end.

There is still a need to provide a simplified and cost-effective manufacturing method of forming a strong, reproducible and uniform clamping ring and a clamping ring having a stop edge, such that the stop edge can be provided on the clamping ring without acting (i.e., machining, thermoforming, etc.) on the main body of the clamping ring (manufactured either by extrusion or by injection molding).

SUMMARY

According to one aspect of the present invention, a method is disclosed of manufacturing a clamping ring for a cold-expansion joining system characterized by; providing and extruded a pipe part made of a cross-linked polymeric material whereby while extruding the pipe part the inner diameter is formed bigger than the outer diameter of a flexible cross-linked polymeric pipe onto which the clamping ring is positioned before making a pipe connection and providing an injection molded annular part having an inner diameter formed smaller than the inner diameter of the extruded part.

The cold-expansion material, i.e., having memory properties, may be made of one or more of a cross-linked polymeric material such as, polyolefin, polyethylene, PEX (PEX-a, PEX-b, PEX-c) or any other material having memory properties.

The injection molded annular part may be made of one or more of a cross-linked polymeric material or a non-cross-linked polymeric material.

Further, the parts are bonded together to form a clamping ring having an inward protruding stop edge at one of its ends.

In order to do so and according to the invention, the outer diameters of the parts are aligned at the outer diameter before bonding.

According to another aspect of the present invention, a clamping ring is disclosed. Such clamping ring formed from an extruded plastic pipe part made of a cross-linked polymeric material and an injection molded annular part bonded together to form a unitary structure comprising an inward protruding stop edge at one of its ends.

BRIEF DESCRIPTION OF THE DRAWINGS

To complement the description being made, and to make it easier to understand the characteristics of the invention, this descriptive report is accompanied by a set of drawings in which, for illustrative purposes only and without limitation, the following has been represented:

FIG. 6a is a cross-sectional views of the embodiment of FIG. 5a.

FIG. 7a shows injection a molded part having non-continuous radially inward extending stop edges according to an embodiments of the present invention.

FIG. 7b shows injection a molded part having non-continuous radially inward extending stop edges according to an embodiments of the present invention.

DETAILED DESCRIPTION OF THE EMBODIMENTS

Figure 1:
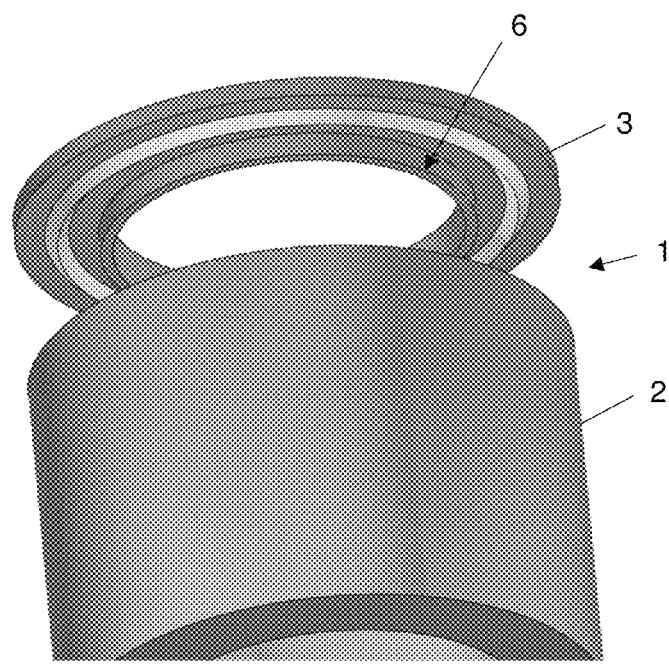
FIG. 1 shows a perspective exploded view of a clamping ring according to a preferred embodiment of the present invention.
Figure 2:
FIG. 2 shows an exploded planar front view of a clamping ring according to a preferred embodiment of the present invention.
Figure 2:
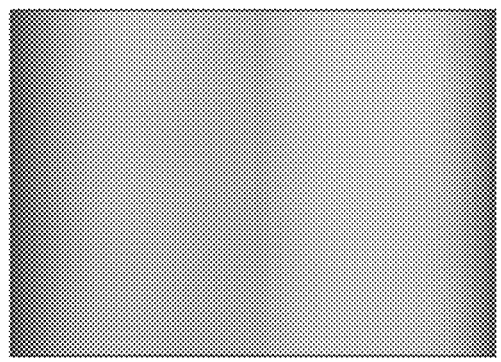
Figure 3:
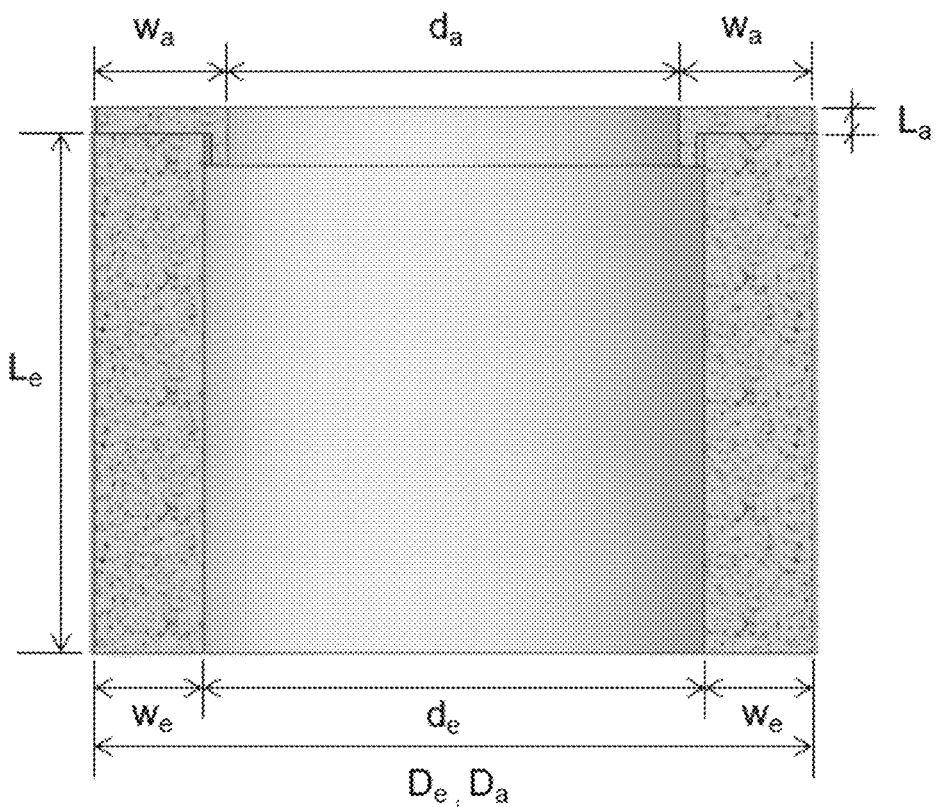
FIG. 3 shows a cross-section of a clamping ring according to a preferred embodiment of the present invention.
Figure 4:
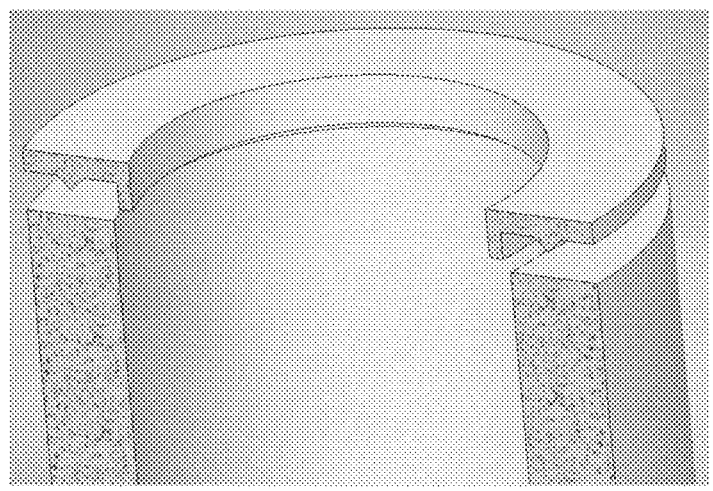
FIG. 4 shows an exploded perspective cross-sectional view of a clamping ring according to a preferred embodiment of the present invention.

FIGS. 1 and 2 show exploded views of a clamping ring 1, according to a preferred embodiment of the present invention, which is comprised of an extruded pipe part 2 and a molded annular element 3.

The manufacturing of the clamping ring comprises: providing an extruded pipe part 2 made of a cross-linked polymeric material having an inner diameter that is formed bigger than the outer diameter of a pipe onto which the clamping ring 1 is positioned before making a pipe connection; providing an injection molded annular part 3 having an inner diameter that is formed smaller than the inner diameter of the extruded pipe part 2; and bonding the extruded pipe part 2 and the molded annular part 3 together in such a manner as to form a unitary structure having an inward protruding stop edge 6 at one of its ends.

The extruded pipe part 2 may be made of a cross-linked polymeric material such as, polyolefin, polyethylene, PEX (PEX-a, PEX-b, PEX-c) or any other similar material exhibiting memory properties such that at room temperature the material may be stretched and immediately or shortly thereafter allowed to shrink back down to the material's previous shape before the stretching operation.

Providing an extruded pipe part 2 may particularly comprise extruding a continuous tubular extrusion pipe having memory properties from the extruder and cutting the extrusion pipe to form independent body parts.

The injection molded annular part 3 may be made of a cross-linked polymeric material or a non-cross-linked polymeric material.

The parts may be bonded together by means of different bonding techniques, such as adhesion, welding (i.e., ultrasonic welding, induction welding, high frequency welding, welding by hot air, welding with metal etch), etc.

When bonding the parts together by means of adhesion, a polyethylene-based adhesive is preferred.

Figure 5A:
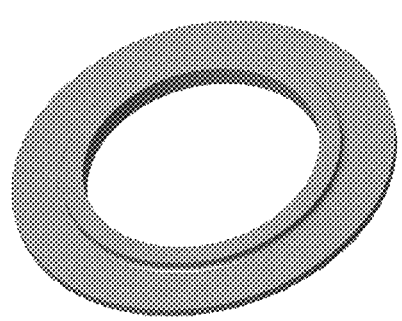
FIG. 5a shows an injection molded annular parts having a radially continuous inward extending stop edge according to an embodiment of the present invention.
Figure 5B:
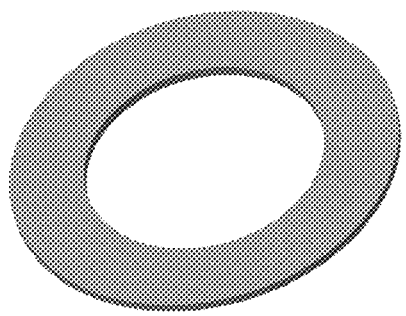
FIG. 5b shows an injection molded annular parts having a radially continuous inward extending stop edge according to an embodiment of the present invention.
Figure 5C:
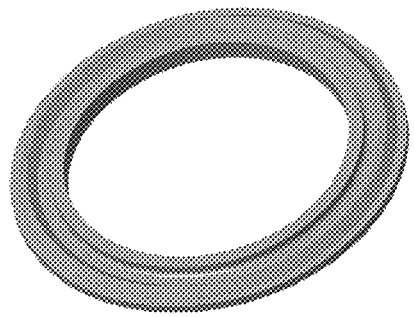
FIG. 5c shows an injection molded annular parts having a radially continuous inward extending stop edge according to an embodiment of the present invention.

As shown in FIGS. 5a, 5b and 5c, the injection molded annular part 3 may have different configurations.

Figure 6A:
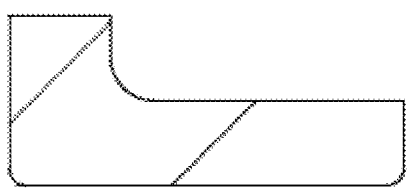
Figure 6B:
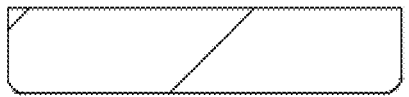
FIG. 6b is a cross-sectional views of the embodiment of FIG. 5b.
Figure 6C:
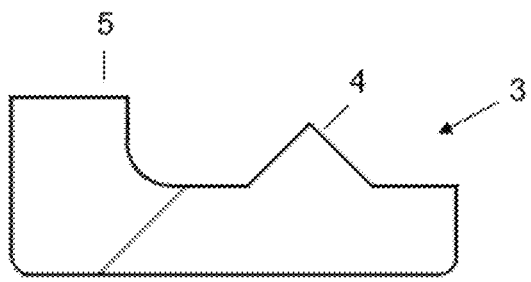
FIG. 6c is a cross-sectional views of the embodiment of FIG. 5c.

When the parts are bonded together by means of ultrasonic welding, the injection molded annular part 3 may comprise a triangular-shaped bead 4, as shown in FIG. 6c, that runs around the entire injection molded annular part 3 to provide a specific volume of material to be melted, acting as an energy director, so that good bond strength can be achieved.

When ultrasonic energy is transmitted through the injection molded annular part 3 under pressure and over time, the energy concentrates at the apex of the triangular-shaped bead 4, that contacts the extruded part pipe 2 resulting in a rapid buildup of heat that causes the bead to melt. The molten material flows across the joint interface, thus forming a molecular bond between the injection molded annular part 3 and the extruded pipe part 2.

Bonding the parts together comprises first placing the injection molded annular part 3 on top of the extruded pipe part 2, such that the parts are aligned at the outer diameter.

The injection molded annular part 3 may comprise a positioning element 5, as shown in FIGS. 6a and 6c, to ensure that the injection molded annular part 3 is in a correct position with respect to the extruded pipe part 2 before bonding the parts together, either by ultrasonic welding, case in which it also may comprise the triangular-shaped bead 4, or any other type of bonding means.

As shown in FIG. 6b the injection molded annular part 3 may also be void of such a triangular-shaped bead 4 and such a positioning element 5.

Figure 7C:
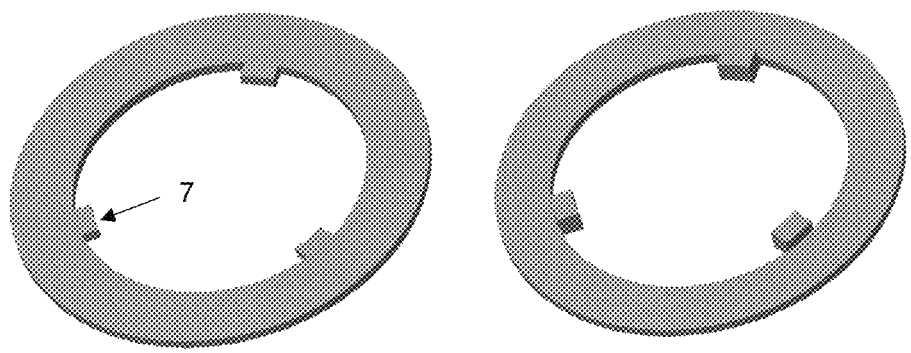
FIG. 7c shows injection a molded part having non-continuous radially inward extending stop edges according to an embodiments of the present invention.
Figure 7C:
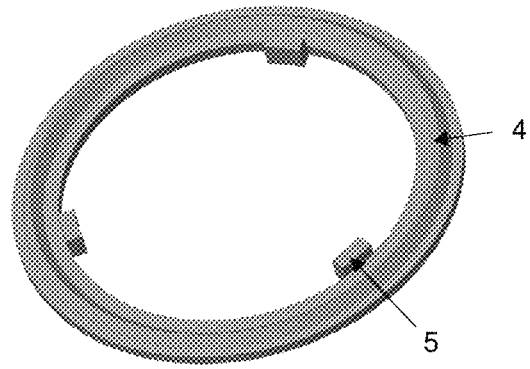

The injection molded annular part 3 may have a radially continuous inward protruding stop edge, as shown in FIGS. 5a, 5b and 5c or a radially non-continuous inward protruding stop edge comprised of at least two (i.e., two, three, four, etc.), preferably three, radially spaced inward protruding flanges 7. As shown in FIGS. 7a, 7b and 7c, when the injection molded annular part has a radially non-continuous inward extending stop edge, such part may also have a triangular-shaped bead 4 and/or a positioning element 5.

TABLE I

| POLYMERIC PIPE Outer Diameter (inch) | PIPE EXTRUDED PART | | | | | MOLDED ANNULAR PART | | | |
|---|---|---|---|---|---|---|---|---|---|
| | $d_e$ (inch) | Tolerance (inch) | $D_e$ (inch) | $L_e$ (inch) | $W_e$ (inch) | $W_a$ (inch) | $d_a$ (inch) | $L_a$ (inch) | $D_a$ (inch) |
| 3/8" | 0.502 | ±0.003 | 0.746 | 0.630 | 0.122 | 0.181 | 0.384 | 0.039 | 0.746 |
| 1/2" | 0.627 | ±0.004 | 0.883 | 0.630 | 0.128 | 0.187 | 0.509 | 0.039 | 0.883 |
| 5/8" | 0.752 | ±0.004 | 1.004 | 0.748 | 0.126 | 0.185 | 0.634 | 0.039 | 1.004 |
| 3/4" | 0.877 | ±0.004 | 1.121 | 0.866 | 0.122 | 0.181 | 0.759 | 0.039 | 1.121 |
| 1" | 1.127 | ±0.005 | 1.405 | 1.102 | 0.139 | 0.198 | 1.009 | 0.039 | 1.405 |
| 1 1/4" | 1.377 | ±0.005 | 1.692 | 1.378 | 0.157 | 0.236 | 1.219 | 0.039 | 1.692 |
| 1 1/2" | 1.627 | ±0.006 | 2.013 | 1.575 | 0.193 | 0.291 | 1.430 | 0.039 | 2.013 |
| 2" | 2.127 | ±0.006 | 2.600 | 2.126 | 0.236 | 0.335 | 1.930 | 0.039 | 2.600 |

As shown in Table 1, the inner diameter of the extruded part, $d_e$, may vary between 0.502 inches and 2.127 inches and the length of the extruded part, $L_e$, may vary between 0.630 inches and 2.126 inches, for example, depending on the outer diameter of the polymeric pipe onto which the clamping ring is positioned. The polymeric pipe has an outer diameter, as provided in ASTM F876-08b.

The inner diameter of the molded annular part, $d_a$, may vary from 0.384 inches to 1.930 inches, depending on the inner diameter of the extruded pipe part 2.

The outer diameter of the extruded pipe part, $D_e$, and the outer diameter of the molded annular part, $D_a$, are substantially identical.

It is obvious to a person skilled in the art that in the course of technical progress, the basic idea of the invention may be carried out in numerous ways. Thus, the invention and its embodiments are not limited to the previous examples, but they may vary within the scope of the appended claims.

The invention claimed is:

1. A method of forming a clamping ring to be used on a flexible cross-linked polymeric pipe when making a pipe connection, the method comprising:
    a) providing an extruded pipe part made of a cross-linked polymeric material, wherein an inner diameter of the extruded pipe part is formed bigger than the outer diameter of the flexible cross-linked polymeric pipe onto which the clamping ring is positioned before making the pipe connection;
    b) providing an injection molded annular part, wherein an inner diameter of the injection molded annular part is formed smaller than the inner diameter of the extruded pipe part; and
    c) bonding the extruded pipe part and the injection molded annular part to form a unitary structure having an inward protruding stop edge at one of end of the bonded extruded pipe part and the injection molded annular part;
    wherein the inner diameter of the annular part is constant along a length of the annular part and of the stop edge of the annular part;
    wherein the inner diameter of the annular part is greater than the length of the annular part; and
    wherein the inward protruding stop edge is radially non-continuous.

2. The method according to claim 1, wherein step (a) further comprises extruding a continuous tubular extrusion pipe of a cross-linked polymeric material and cutting the extrusion pipe to form independent extruded pipe parts.

3. The method according to claim 1, wherein bonding the parts in step (b) comprises placing the injection molded annular plastic part on top of the extruded pipe part, such that the parts are aligned at the outer diameters.

4. The method according to claim 1, wherein bonding the parts in step (b) comprises welding the injection molded plastic annular part and the extruded pipe part together.

5. The method according to claim 4, wherein welding is performed by ultrasonically welding the injection molded annular part and the extruded pipe part.

6. The method according to claim 1, wherein the injection molded annular part further comprises a triangular-shaped bead to act as an energy director when ultrasonically welding the parts together.

7. The method according to claim 1, wherein bonding the parts in step (b) comprises bonding the parts by means of an adhesive.

8. The method according to claim 1, wherein the cross-linked polymeric material of the extruded pipe part is selected from a group consisting of PEX-a, PEX-b or PEX-c.

9. The method according to claim 1, wherein the injection molded annular part is made of a non-cross-linked polymeric material.

10. The method according to claim 1, wherein the inner diameter of the extruded pipe part is between 0.502 inches and 2.127 inches.

11. The method according to claim 1, wherein the inner diameter of the injection molded annular part is between 0.384 inches and 1.930 inches.

12. The method according to claim 1, wherein the flexible cross-linked polymeric pipe has an outer diameter, onto which the clamping ring is positioned, as provided in ASTM F876-08b.

13. The method according to claim 1, wherein a ratio of the inner diameter of the annular part to a length of the annular part is between 9.85:1 and 49.5:1.

14. The method according to claim 1, wherein a ratio of a length of the extruded pipe part to a length of the annular part is between 16.2:1 and 54.5:1.

15. A clamping ring for use on a flexible cross-linked polymeric pipe when making a pipe connection, the clamping ring comprising: an extruded plastic pipe part made of a cross-linked polymeric material and an injection molded annular part bonded together to form a unitary structure comprising an inward protruding stop edge at one of its ends;
    wherein the inner diameter of the annular part is constant along a length of the annular part and of the stop edge of the annular part;
    wherein the inner diameter of the annular part is greater than the length of the annular part; and wherein the inward protruding stop edge is radially non-continuous.

16. The clamping ring according to claim 15, wherein the cross-linked polymeric material of the extruded pipe part is selected from a group consisting of PEX-a, PEX-b or PEX-c.

17. The clamping ring according to claim 15, wherein the molded annular plastic part is made of a non-cross-linked polymeric material.

18. The clamping ring according to claim 15, wherein a ratio of the inner diameter of the annular part to a length of the annular part is between 9.85:1 and 49.5:1.

19. The clamping ring according to claim 15, wherein a ratio of a length of the extruded pipe part to a length of the annular part is between 16.2:1 and 54.5:1.

* * * * *